Figure 1:
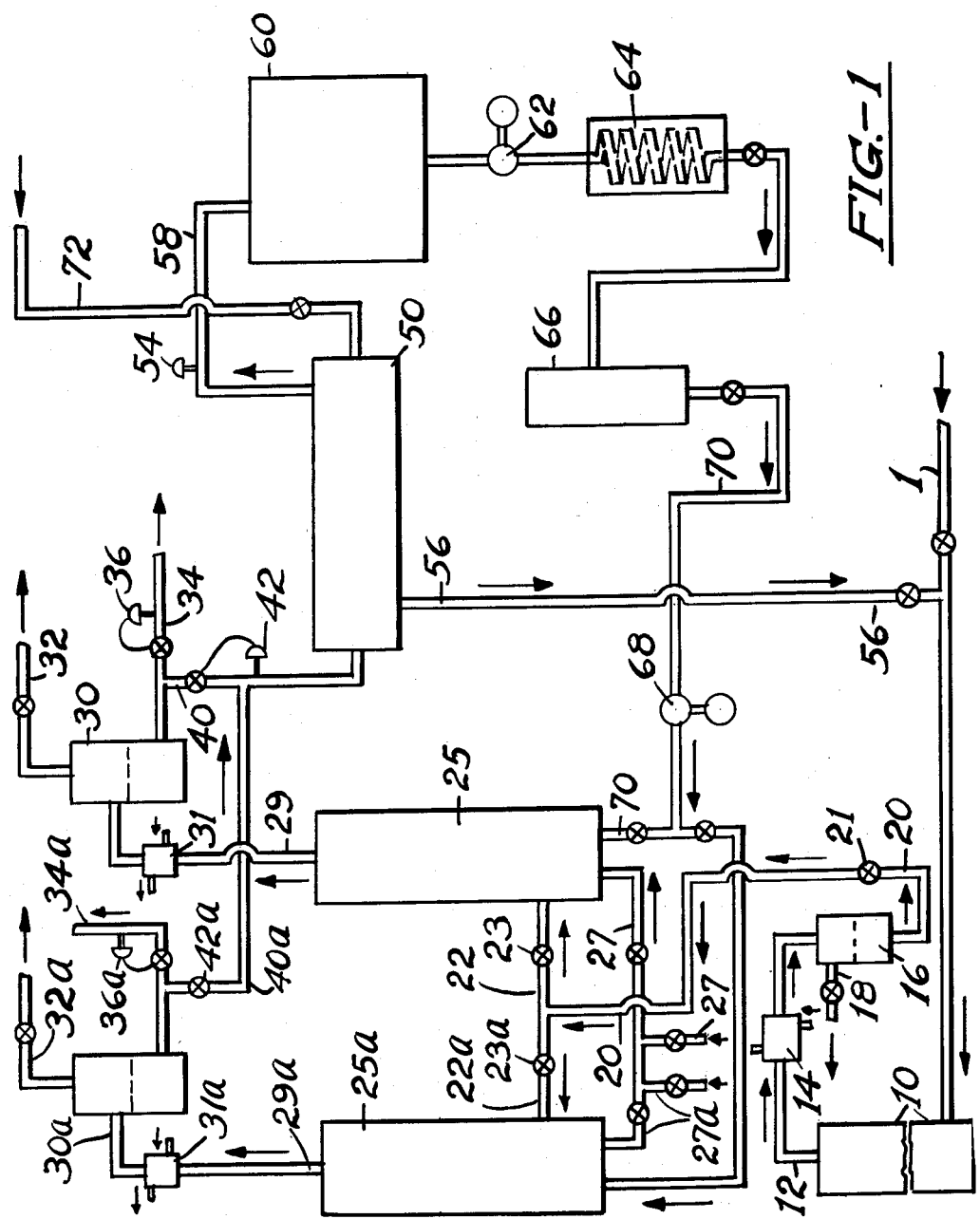

Nov. 29, 1955         J. K. MERTZWEILER ET AL         2,725,401
              SYNTHESIS OF OXYGENATED ORGANIC COMPOUNDS
Filed Nov. 19, 1948                                  2 Sheets-Sheet 1

Joseph K. Mertzweiler  Inventors
Warren M. Smith
By J. Cashman   Attorney

United States Patent Office 2,725,401
Patented Nov. 29, 1955

2,725,401

SYNTHESIS OF OXYGENATED ORGANIC COMPOUNDS

Joseph K. Mertzweiller and Warren M. Smith, Baton Rouge, La., assignors to Esso Research and Engineering Company, a corporation of Delaware Application November 19, 1948, Serial No. 60,914

5 Claims. (Cl. 260—604)

The present invention relates to an improved synthesis process for the production of oxygenated organic compounds by reacting organic compounds having an olefinic double bond with gas mixtures containing carbon monoxide and hydrogen at high pressures and elevated temperatures in the presence of suitable catalysts. More particularly, the invention is concerned with an improved method for removing dissolved metal carbonyl and carbon monoxide from the oxygenated synthesis product prior to storage or further treatment such as catalytic hydrogenation.

The synthesis of oxygenated organic compounds from odefinic compounds and mixtures of CO and $H_2$ is well known in the art. The olefinic starting material is reacted in the liquid state with CO and $H_2$ in the presence of a metal catalyst, usually an iron group metal catalyst such as a suitable cobalt compound. The reaction product consists essentially of organic carbonyl compounds, mainly aldehydes, and alcohols having one carbon atom more per molecule than the olefinic feed material. The oxygenated product may be hydrogenated in a second catalytic stage to convert the aldehydes to the corresponding alcohols.

Practically all types of organic compounds having an olefinic double bond may be used as the starting material, including aliphatic olefins and diolefins, cyclo-olefins, aromatics with olefinic sidechains, oxygenated compounds having olefinic double bonds, etc. The metal catalyst may be present as a solid or in the form of an organic salt soluble in the olefinic feedstock. Suitable reaction conditions include temperatures of about 150°–450° F., pressures of 100–300 atmospheres, hydrogen to carbon monoxide ratios of about 0.5–2:1, liquid feed rates of about 0.1–5.0 v./v./hr., and gas feed rates of about 1000–45000 standard cu. ft. of gas mixture per barrel of liquid olefinic feed.

Similar temperatures and pressures and conventional hydrogenation catalysts such as nickel, copper, tungsten, oxides or sulfides of group VI and group VIII metals, etc., may be employed in the second stage for the hydrogenation of the carbonyl compounds.

The iron group metals used as catalysts in the first stage of the process react with CO to form metal carbonyls. This is particularly true for cobalt, the preferred and most active oxygenation catalyst. This cobalt carbonyl which dissolves in the liquid oxygenated product tends to decompose under low CO partial pressures even at relatively low temperatures and very rapidly at elevated temperatures, to form free CO and insoluble metallic cobalt. Metallic cobalt so separated seriously interferes with the further processing of the oxygenated reaction product because it may cause excessive pressure drop in the equipment due to the deposition of cobalt in lines and vessels or it may deactivate the hydrogenation catalyst of the second stage by surface deposition of cobalt. Since cobalt carbonyl slowly decomposes under low CO partial pressures even on standing at atmospheric pressure, it should be removed as soon upon the formation of the oxygenated product as possible and returned to the first stage in the most efficient manner.

Prior to the present invention it has been suggested to remove cobalt carbonyl from the oxygenated product by treating with hydrogen at relatively high pressures and elevated temperatures in vessels packed with an inert solid on which the separated cobalt is deposited and from which a substantially carbonyl-free liquid product may be withdrawn, the liberated CO being removed with the hydrogen used for treating. When sufficient cobalt is deposited in this manner, the decobalting vessel may be used as the first stage reactor by passing the feed olefins and synthesis gas through the decobalting vessel at oxygenation conditions, using the original first stage reactor which is now depleted of cobalt, as the decobalting vessel. However, since the rate of cobalt removal in the course of the oxygenation reaction is higher than the rate of cobalt deposition from the cobalt carbonyl in the decobalter, this process is difficult to control and requires frequent switching between the oxygenation and decobalting vessels which is undesirable, particularly in the type of high pressure operation here involved.

It has also been suggested to convert the metallic cobalt deposited in the decobalter into cobalt carbonyl in the presence of liquid oxygenated product dissolving the carbonyl formed. Since the rate of carbonyl formation decreases as cobalt is removed, excessive amounts of solvent are required to remove a major proportion of cobalt metal from the decobalter and the solution obtained is not as such suitable for use in the oxygenation reactor. While some concentration may be accomplished by flashing off the solvent, the high boiling solvent constituents interfere with an efficient operation. In addition the presence of oxygenated compounds in the feed to the oxygenation reactor is undesirable.

The present invention overcomes these difficulties and affords various additional advantages. These advantages, the nature of the invention and the manner in which it is carried out, will be fully understood from the following description thereof read with reference to the accompanying drawing which shows semi-diagrammatic views of apparatus adapted to carry out the invention.

In accordance with the present invention the carbonyl-forming catalyst metal, particularly cobalt, deposited on the inert packing of a conventional decobalting vessel of the type described above is contacted with a gas rich in CO in the presence of a suitable organic solvent for metal carbonyl, having a boiling point not substantially above 210° F. at atmospheric pressure, at conditions conducive to the conversion of the cobalt metal into cobalt carbonyl and to form a solution of the carbonyl in said solvent. The solution formed, preferably after adjustment of its concentration is passed to the oxygenation zone to supply oxygenation catalyst thereto. The gas rich in CO is preferably synthesis gas produced for the oxygenation reaction.

One embodiment of the invention involves the conversion of the metal deposited in the decobalter, with synthesis gas into metal carbonyl in the presence of liquid butane and/or pentane, or liquid or liquefiable saturated hydrocarbons having similar physical characteristics, sufficient in amounts to dissolve the metal carbonyl as it is formed. The critical temperatures of butane and pentane (307° F. and 387° F., respectively) are such that liquid phase operation may be achieved at the temperatures required for the conversion of the metallic cobalt, or other catalyst metal, to the carbonyl. Furthermore, the cobalt carbonyls, for example, have a low vapor pressure at the boiling temperatures of butane and pentane, particularly at atmospheric pressure or thereabouts. Thus, the solvent may be easily removed from the metal carbonyl by simple flashing. The metal carbonyl or a suitable concentrate thereof in the hydrocarbon solvent may then be dissolved in the olefin feed and used or blended as required to furnish the catalyst needed in the oxygenation zone. Desirable operating conditions for the formation and removal of cobalt carbonyl in the decobalter include temperatures of about 200°–350° F., pressures affording CO partial pressures of about 1000–1500 lbs. per sq. in. and solvent feed rates of about 0.5 to 5 volumes per volume of decobalter space per hour.

In accordance with another embodiment of the invention, synthesis gas and a portion of the liquid olefin feed to the oxygenation reactor are used to convert the metal deposited in the decobalter to carbonyl and to dissolve the carbonyl formed in the liquid feed olefins, and the solution so formed is reblended with the olefin feed to the oxygenation reactor in proportions adequate to provide a composite oxygenation reactor feed stream of the desired metal carbonyl concentration. The conditions of metal carbonyl formation and solution are maintained at the optimum for metal carbonyl formation rather than for the oxygenation reaction. In the case of cobalt, these optimum conditions include temperatures of about 200°–350° F. which are substantially lower than optimum oxygenation temperatures.

While hydrocarbon solvents have been specifically referred to above, it is noted that other solvents of a proper boiling temperature and dissolving metal carbonyls may be used, such as diethylether, methyl alcohol, acetone, halogenated hydrocarbons, etc. In both embodiments of the invention described above, two decobalting vessels are preferably employed in combination with one oxygenation reactor, the two decobalting vessels being alternatively used for metal deposition and metal carbonyl formation.

It will be appreciated that operation in accordance with the invention permits efficient catalyst recovery without the disadvantages of prior art processes. More specifically, the catalyst recovery is not detrimentally affected by the discrepancy in the rates of metal carbonyl formation in the oxygenation reactor and carbonyl decomposition in the decobalter because the operation of both reactions is substantially continuous and not interdependent. In addition, the catalyst may be supplied in the most active form, i. e. the metal carbonyl form, and need not go through the intermediate carbonyl-forming stage in the oxygenation zone whereby the efficiency of the oxygenation process proper is enhanced. The catalyst solution may be readily adjusted in concentration without interference by high boiling products and it may be supplied to the oxygenation reactor, free of oxygenated compounds.

Having set forth its general nature, the invention will be best understood from the following more detailed description in which reference will be made to the accompanying drawing wherein.

Figure 2:
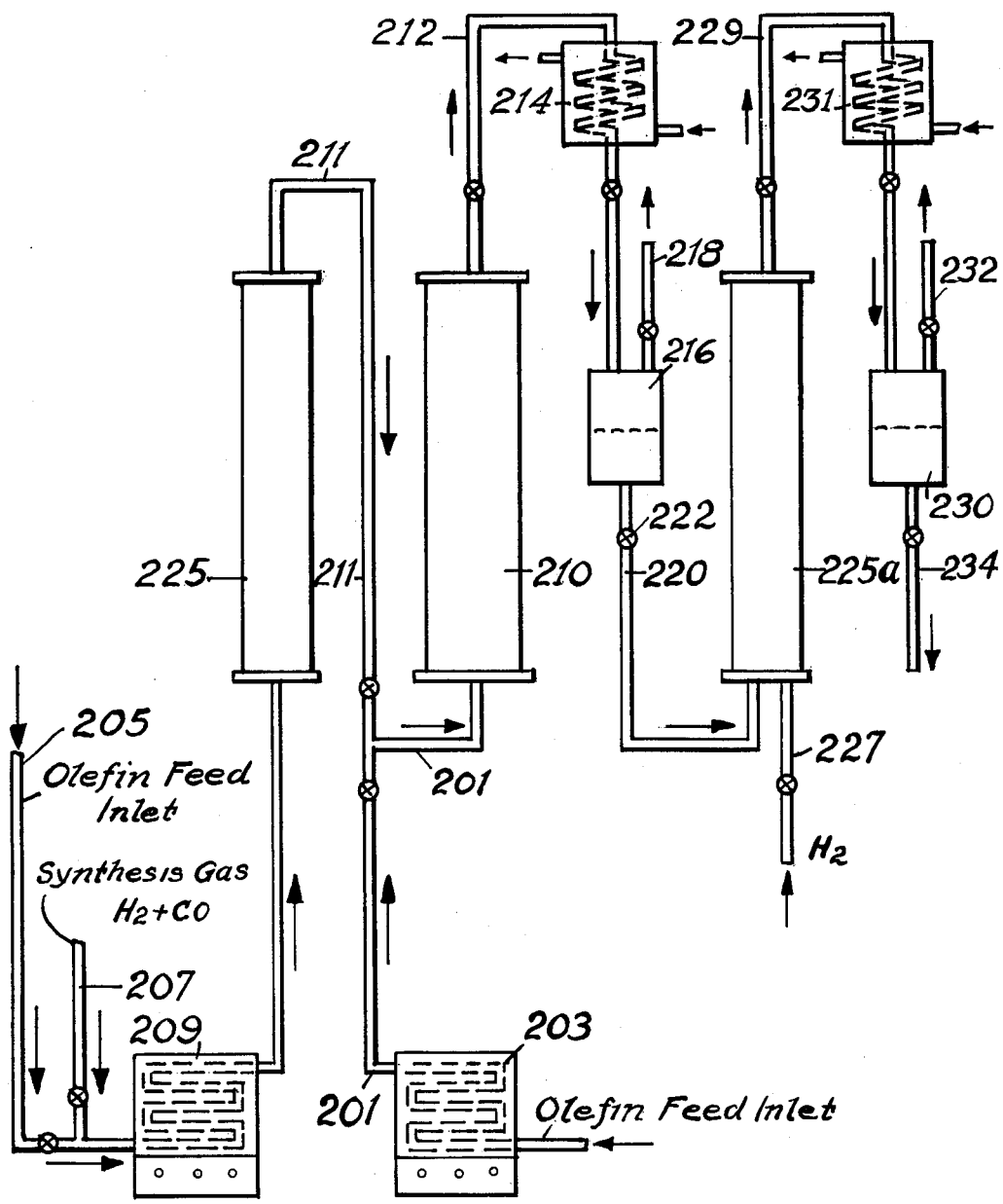

Figure 1 illustrates a system adapted to carry out the embodiment of the invention using a saturated hydrocarbon as the solvent for the metal carbonyl in the decobalter; and Figure 2 shows an apparatus suitable for the use of the liquid olefin feed to the oxygenation reactor as the solvent for the metal carbonyl formed in the decobalter.

Referring now in detail to Figure 1, the system illustrated therein essentially comprises an oxygenation reactor 10, a set of decobalting vessels 25 and 25a and a flash drum 50, whose functions and cooperation will be forthwith explained using the removal and recovery of cobalt carbonyl from an oxygenated reaction product having an average of 7–9 carbon atoms per molecule as an example. It should be understood, however, that the system may be applied in a substantially analogous manner to the treatment of heavier or lighter oxygenated products containing the same or a different metal carbonyl.

In operation, the liquid olefinic feed stock having an average of about 6–8 carbon atoms per molecule and a gas mixture containing CO and $H_2$ in the approximate ratio of 1:1 are introduced through line 1 into the bottom of reactor 10. The catalyst in the form of a concentrated solution of cobalt carbonyl in liquid butane is supplied to line 1 from line 56 as will appear more clearly hereinafter. The amount of catalyst so added preferably corresponds to a concentration of about 0.1–0.3% by weight of cobalt in the liquid olefin feed. If desired, reactor 10 may be provided with a packing of a porous inert material such as silica gel, pumice or the like.

Increased yields of oxygenated products can be obtained by improving gas liquid contacting in reactor 10 by the use of wire screen packings such as crinkled wire screen or Berl saddles stamped of wire screen.

The following data demonstate this effect:

| Run Hours | 1–2 | 1–2 | 1–2 |
|---|---|---|---|
| Type Packing | None | (1) | (2) |
| Feed, v./v./hr | 0.52 | 0.46 | 0.50 |
| Wt. percent Cobalt | 0.122 | 0.125 | 0.118 |
| Average Reactor Temp., °F | 353 | 345 | 352 |
| Average Reactor Pressure, p. s. i. g | 3,000 | 3,050 | 3,075 |
| Fresh Gas, $H_2$/CO ratio | 0.99 | 1.07 | 1.14 |
| Fresh + Recycle Gas, $H_2$/CO ratio | 0.75 | 1.00 | 1.00 |
| High Line Gas, C. F./B | 2,300 | 2,710 | 2,340 |
| Fresh Gas, C. F./B | 2,370 | 3,040 | 2,360 |
| Olefin Conversion, percent (From Gravity Correlations) | 68 | 65 | 73 |

[1] ¼″ ceramic Raschig rings.
[2] Crinkle wire screen.

Conversion of olefins to aldehydes may be further improved by the dispersion of the hydrogen and carbon monoxide gases in the liquid reactants. This dispersion into very small bubbles may be effected by forcing the gas through a perforated distributor. Such a distributor may be made from one of the several types of sintered material now available, such as sintered metals, sintered alumina, or sintered glass.

This type of reactor has advantages over the conventional packed vessel in that: additional reaction volume is provided by the removal of packing material, better contacting of gas and liquid is effected and the removal of obstruction in the reactor provides for circulation in the vessel.

Reactor 10 may be operated at otherwise conventional oxygenation conditions including temperatures of about 300°–400° F., pressures of about 2500–3500 lbs. per sq. in., a gas feed rate of about 3000–40000 standard cu. ft. per barrel of liquid feed and a liquid feed throughput of about .2–2 volumes per volume of reactor space per hour. The reaction products containing about 0.1 to 0.3% by weight of dissolved cobalt in the form of cobalt carbonyl are removed together with unreacted gas, through line 12, cooled in cooler 14 to about 80°–200° F. and passed to a liquid gas separator 16. Gas separated in separator 16 may be withdrawn through line 18 and returned to reactor 10 for reuse.

The liquid separated in separator 16, still at the pressure of reactor 10, is withdrawn through line 20 provided with pressure release valve 21. The liquid product, which may now be under a lower pressure of, say, about 100–2500 lbs. per sq. in., is supplied at this pressure to a lower portion of decobalting vessel 25 which is preferably packed with a suitable inert material, such as pumice, activated carbon, Raschig rings, etc. Simultaneously hydrogen is supplied through line 27 to the bottom of vessel 25 in amounts of about 100 to 1000 cu. ft. per barrel of liquid feed. Vessel 25 is maintained at a temperature of about 250°–400° F. by any suitable conventional means such as adequate preheat of the hydrogen feed, and/or recycle of hot decobalted liquid, etc. The space velocity within vessel 25 should be about 0.5 to 2.0 volumes of liquid product per volume of contact space per hour, to assure substantially complete decomposition of the cobalt carbonyl during passage of the liquid through vessel 25. Metallic cobalt is deposited on the packing and CO is liberated.

A mixture of CO and $H_2$, and liquid product now containing less than 0.02% by weight of cobalt, is withdrawn upwardly from vessel 25 and passed through line 29 to a liquid-gas separator 30, after cooling to about 80°–150° F. in a conventional manner in cooler 31. The gases are withdrawn overhead through line 32 to be used for any desired purpose, for instance to be recycled to vessel 25, preferably after removal of CO, or to be used as oxygenation feed gas, or for cobalt carbonyl formation in vessel 25a as will appear hereinafter. The decobalted liquid is withdrawn through line 34 provided with a pressure release valve 36 to be passed to storage or a hydrogenation stage (not shown).

When a predetermined quantity of cobalt, say about 2 to 5 lbs. per cu. ft., has been deposited on the packing of vessel 25, valve 23 in line 22 is closed and valve 23a in line 22a is opened, thus directing the flow of cobalt-containing oxygenated product to vessel 25a which is now supplied through line 27a with hydrogen and operated substantially as described above in connection with vessel 25, and illustrated by product withdrawal line 29a, separator 30a, gas withdrawal line 32a, and liquid product recovery line 34a provided with pressure release valve 36a.

Synthesis gas instead of hydrogen is now supplied through line 27 at a rate of about 500 to 4000 v./v./hr. and liquid butane or pentane is fed by pump 68 through line 70 to the bottom of vessel 25 at a rate of about 0.5 to 5.0 volumes per volume per hour as will appear more clearly hereinafter. Vessel 25 is now operated at a temperature of about 200°–350° F. and a pressure of about 2000–4000 lbs. per sq. in. to establish a CO partial pressure of at least 1000–1500 lbs. per sq. in. At these conditions cobalt carbonyl is rapidly formed and dissolved in the butane or pentane which remains liquid. The mixture of spent gas and cobalt carbonyl solution in butane containing about 0.5 to 3.0% by weight of cobalt carbonyl is withdrawn through line 29 and separated in separator 30. Gas is withdrawn through line 32 and may be recycled to reactor 10. The liquid leaves separator 30 via line 40 and is depressurized to about 100 to 200 lbs. per sq. in. gauge by means of valve 42, so as to maintain the liquid phase. The liquid then enters flash drum 50. By means of a conventional pressure control 54, at least a substantial proportion of the butane or pentane is flashed off. Pressures of about 0.5 to 20 lbs. per sq. in. and temperatures of about 50°–150° F. are suitable for this purpose. A liquid cobalt carbonyl concentrate which preferably contains about 10–30% by weight of cobalt carbonyl is withdrawn through line 56 and supplied to feed line 1 as described above, if desired via a storage vessel (not shown).

The vaporized butane or pentane may be passed by pump 62 through line 58 to a surge drum 60 and from there through a cooler 64 to a liquid storage vessel 66 from which it may be returned by means of booster pump 68 and line 70 to vessel 25 as described above.

As an alternative procedure, the solvent in drum 50 may be flashed off to leave a highly concentrated or solid residue of cobalt carbonyl. Fresh liquid olefin feed from line 1 may be supplied through line 72 to drum 50 in amounts sufficient to dissolve the carbonyl. This solution may then be passed to storage and reuse through line 56 as described above.

When the cobalt metal in vessel 25 is exhausted the operation of vessel 25 and 25a is reversed again as will be understood by those skilled in the art from the above description of Figure 1, wherein corresponding elements used in different cycles bear the same reference numerals differing by the affix "a." The reference numeral 50 and higher numerals identify elements which are used for the same purposes during both cycles as described above.

The following laboratory data illustrate the feasibility of operation using butane and/or pentane as the solvent in accordance with this embodiment of the invention.

*Example*

A solution of cobalt carbonyl was prepared by treating a petroleum ether fraction (boiling range 90°–135° F.) with 13.6 wt. per cent of cobalt (30% CO) on a silica gel support. The mixture was treated with 1.1/1$H_2$/CO synthesis gas at 3000 p. s. i. g. and 300° F. for 5 hours and resulted in a solution containing 0.596 wt. per cent cobalt.

A 309 gm. charge of this product was distilled in glass apparatus at 210 mm. Hg pressure during which time the liquid temperature was maintained between 48° F. and 68° F. and the vapor temperature from 75° F. to 80° F. A residue of total solid cobalt carbonyl (reddish colored slurry) of 12.0 gms. was recovered. The slurry product was dissolved in a $C_7$ fraction of polypropylene to obtain a solution containing 0.275 wt. per cent of cobalt. The cobalt balance is shown in the following tabulation:

| Component | Wt. Per-cent Cobalt | Total Cobalt, Gms. | Cobalt Recovered, Wt. Percent |
|---|---|---|---|
| Feed | 0.596 | 1.841 | |
| Flashed distillate | 0.014 | 0.042 | 2.3 |
| $C_7$ Polymer Solution | 0.275 | 1.655 | 89.9 |
| Cobalt Loss | | | 7.8 |

These data prove that cobalt metal is converted to the carbonyl and may be recovered to the extent of about 90% by means of a pentane wash system in accordance with the invention.

Referring now to Figure 2 of the drawing, the system shown essentially comprises an oxygenation reactor 210 and two alternating decobalting vessels 225 and 225a of the type of vessels 25 and 25a of Figure 1, which may be operated as follows:

The design of, and conditions in, oxygenation reactor 210 and the design of, and conditions during the product decobalting cycles of vessels 225 and 225a may be generally similar to those described for corresponding operations in connection with reactor 10 and vessels 25 and 25a of Figure 1. Assuming vessel 225 has just been used as a product decobalting vessel as described in connection with vessel 25 of Figure 1, and is now loaded with metallic cobalt, the operation of the system is as follows.

Reactor 210 may be operated at conventional oxygenation conditions the same as indicated for reactor 10 of Figure 1. A portion of the liquid olefin feed amounting to about 25–75% of the total olefin feed of reactor 210, may be preheated in heater 203 to a temperature of about 300°–350° F. and supplied through line 201 to the bottom of reactor 210, at a pressure of about 2500 to 3500 lbs. per sq. in. The remainder of the olefin feed flows through line 205 wherein it is mixed with the total synthesis gas feed for reactor 210 supplied from line 207 in amounts of about 3000–40000 s. c. f./bbl. of total liquid feed. This synthesis gas may have a CO:$H_2$ ratio of greater than 1, say of about 1.2–1.5. The mixture may be preheated in heater 209 to a temperature of about 250°–300° F. at which it is supplied to vessel 225 maintained at a pressure of about 2500 to 3500 lbs. per sq. in. At these conditions the cobalt content of vessel 225 is converted to cobalt carbonyl and dissolved in the liquid olefins to form a solution containing about 0.1 to 1.2 wt. percent of cobalt. The mixture of liquid and gas passes through line 211 into line 201 wherein it is combined with the remainder of the olefin feed to establish a desirable catalyst concentration of about 0.1 to 0.3 wt. percent of cobalt in the total liquid feed.

The total oxygenation effluent is withdrawn from reactor 210 through line 212, cooled in cooler 214 to about 50°–200° F. and separated in separator 216 into gas and liquid. Gas may be withdrawn through line 218 and liquid containing dissolved cobalt carbonyl is passed through line 220 provided with pressure release valve 222, to decobalting vessel 225a which is maintained at suitable decobalting pressures of about 100–2500 lbs. per sq. in. and at a temperature of about 300°–350° F. Hydrogen, preferably preheated to about 600° F. is supplied through line 227 at a rate of about 100–1000 s. c. f./bbl. of liquid feed. Under these conditions, cobalt carbonyl is rapidly decomposed and cobalt is deposited in vessel 225a. Liquid product substantially free of cobalt carbonyl, admixed with $H_2$ and liberated CO, is withdrawn through line 229, cooled in cooler 231 to about 80°–150° F. and passed to separator 230. Gas is withdrawn from separator 230 through line 232 and cobalt-free product is recovered through line 234 to be passed to storage or a hydrogenation stage (not shown). When the cobalt in vessel 225 is depleted, the functions of vessels 225 and 225a will be reversed in a manner obvious to those skilled in the art.

Many modifications of the invention may appear to those skilled in the art without departing from the spirit of the invention as described above.

What is claimed is:

1. A process for the production of synthetic oxygen-containing compounds in which aldehydes are produced in good yields by the reaction of olefinic compounds with carbon monoxide and hydrogen, in which a fluid cobalt carbonyl is used as catalyst, which comprises contacting solid cobalt metal with a gas comprising carbon monoxide, in the absence of olefin feed, in a first zone whereby a fluid cobalt carbonyl is formed, passing said fluid cobalt carbonyl as catalyst through a second zone together with an olefin, carbon monoxide, and hydrogen, the second zone being operated in a continuous manner under the conditions of the oxo reaction, said fluid cobalt carbonyl being the sole catalytic material introduced in the second zone, withdrawing from the second zone a mixture comprising synthetic oxygen-containing compounds and fluid cobalt compounds, contacting said mixture in a third zone with a solid support material under conditions for the decomposition of the fluid cobalt compound with deposition of cobalt metal upon the support, and withdrawing the synthetic oxygen-containing compound from the third zone and wherein the flow through the system between the zones is periodically reversed when a predetermined amount of cobalt has been deposited in the third zone and conditions in the system adjusted so that a fluid cobalt carbonyl is produced in the third zone and fluid cobalt compounds are decomposed in the first zone, the concentration of cobalt in the second zone being maintained within 0.1 to 0.3%.

2. In the process wherein olefinic hydrocarbons are reacted in an initial carbonylation zone at elevated temperatures and pressures with carbon monoxide and hydrogen in the presence of a cobalt carbonylation catalyst to form a reaction product comprising aldehydes, and a stream of said product containing in solution substantial amounts of cobalt carbonyl is withdrawn from said reaction zone and passed to a decobalting zone wherein said cobalt carbonyl is decomposed in the presence of heat and hydrogen to cobalt metal and carbon monoxide, the improvement which comprises maintaining two decobalting zones in cooperation with said carbonylation zone, alternately employing one of said decobalting zones as a catalyst decomposition zone and the other as a catalyst recovery zone, interrupting the flow of said product stream containing cobalt carbonyl to said first-named decobalting zone when employed as a catalyst decomposition zone after a predetermined amount of cobalt has been deposited therein, passing through said first-named decobalting zone now containing substantial amounts of deposited cobalt, a portion of said olefinic hydrocarbon feed and at least the major part of the total synthesis gas feed comprising a gas stream comprising $H_2$ and CO, maintaining a pressure of about 2500 to 3500 p. s. i. g. within said zone, maintaining a temperature of about 200° to about 300° F. within said zone adapted to the conversion of cobalt to cobalt carbonyl, but whereby olefins are not significantly converted to aldehydes, passing a stream of olefins and cobalt carbonyl and unreacted CO and $H_2$ from said zone to said carbonylation reaction zone, adding the balance of said olefinic feed to said zone, maintaining temperatures and pressures in the range of from about 300° to 350° F. and 2500 to 3500 p. s. i. g. in said zone whereby aldehyde product is formed, passing said aldehyde product and dissolved cobalt carbonyl to a second decobalting zone, depositing metallic cobalt in said zone, switching the flow of said product stream to said first-named decobalting zone when the cobalt content of said first-named zone approaches exhaustion and concurrently switching the flow of said olefin and gas stream to said second decobalting zone.

3. The process of claim 2 wherein the CO to $H_2$ ratio of the gas fed to said decobalting zone employed as a catalyst recovery zone is greater than 1:1.

4. The process of claim 2 wherein said olefinic compounds comprise a feed stock containing from about 6 to about 8 carbon atoms per molecule.

5. The process of claim 2 wherein said predetermined amount of deposited cobalt prior to switching said streams is about 2 to 5 pounds per cubic foot.

References Cited in the file of this patent

UNITED STATES PATENTS

| 2,250,421 | Riblett | July 22, 1941 |
| 2,464,916 | Adams et al. | Mar. 22, 1949 |
| 2,508,743 | Bruner | May 23, 1950 |
| 2,571,160 | Parker et al. | Oct. 16, 1951 |
| 2,587,858 | Keulemans | Mar. 4, 1952 |
| 2,658,083 | Burney et al. | Nov. 3, 1953 |

OTHER REFERENCES

Synthesis of Hydrocarbons & Chemicals from CO and $H_2$, U. S. Naval Technical Mission in Europe Rept. No. 248–45, October 29, 1945, pgs. 122 and 125.

German Pat. Application I 72,531, T. O. M. Reel 36 (Items 21 and 36), April 18, 1946.

Willemart Bull. Soc. Chim. de France, 5th Series, vol. 14, March-April 1947, pgs. 152–157.

Fiat Final Report 1,000 P. B. 81, 383, December 26, 1947, pgs. 8 and 13.

Adkins et al.: "Preparation of Aldehydes from Alkenes," Jour. Amer. Chem. Soc., vol. 70, No. 1, January 1948, pp. 383–386.